United States Patent
Jang et al.

(10) Patent No.: US 8,377,205 B2
(45) Date of Patent: Feb. 19, 2013

(54) APPARATUS FOR PRODUCING SILICON NANOCRYSTALS USING INDUCTIVELY COUPLED PLASMA

(75) Inventors: Bo-Yun Jang, Daejeon-si (KR); Chang-Hyun Ko, Daejeon-si (KR); Jeong-Chul Lee, Daejeon-si (KR); Joon-Soo Kim, Daejeon-si (KR); Joo-Seok Park, Daejeon-si (KR)

(73) Assignee: Korea Institute of Energy Research, Daejeon-Si (KR)

( * ) Notice: Subject to any disclaimer, the term of this patent is extended or adjusted under 35 U.S.C. 154(b) by 389 days.

(21) Appl. No.: 12/605,838

(22) Filed: Oct. 26, 2009

(65) Prior Publication Data
US 2010/0203334 A1 Aug. 12, 2010

(30) Foreign Application Priority Data
Feb. 10, 2009 (KR) .................. 10-2009-0010797

(51) Int. Cl.
*C30B 21/04* (2006.01)
(52) U.S. Cl. ............ 117/200; 117/202; 117/86; 117/89; 117/108
(58) Field of Classification Search .................. 117/200, 117/202, 86, 89, 108
See application file for complete search history.

(56) References Cited

U.S. PATENT DOCUMENTS

| | | | |
|---|---|---|---|
| 6,544,333 B2 * | 4/2003 | Keck et al. ................ | 117/200 |
| 2002/0056474 A1 | 5/2002 | Sugawara et al. | |
| 2009/0099004 A1 * | 4/2009 | Henderson et al. ......... | 502/21 |
| 2009/0291557 A1 * | 11/2009 | McPeak et al. ............ | 438/680 |

FOREIGN PATENT DOCUMENTS

| | | |
|---|---|---|
| JP | 6-267697 A | 9/1994 |
| JP | 10-189291 A | 7/1998 |
| KR | 10-0805776 B1 | 2/2008 |

OTHER PUBLICATIONS

Gorla et al, "Silicon and Germanium nanoparticle formation in an inductively coupled plasma reactor", Journal of Vacuum Science Technology A 15(3) May 1997 pp. 860-864.*

* cited by examiner

*Primary Examiner* — Bob M Kunemund
(74) *Attorney, Agent, or Firm* — Lowe Hauptman Ham & Berner, LLP

(57) ABSTRACT

The present disclosure relates to an apparatus for producing silicon nanocrystals, which can minimize plasma diffusion by finely adjusting a plasma region created by an ICP coil. The apparatus includes a reactor having an ICP coil wound around an outer wall thereof and a tube inserted into the reactor, wherein a primary gas for forming silicon nanocrystals and a secondary gas for surface reaction of the silicon nanocrystals are separately supplied to the reactor through an inner side and an outer side of the tube, respectively.

8 Claims, 7 Drawing Sheets

APPARATUS FOR PRODUCING SILICON NANOCRYSTALS USING INDUCTIVELY COUPLED PLASMA

BACKGROUND OF THE INVENTION

1. Field of the Invention

The present invention relates to an apparatus for producing silicon nanocrystals based on inductively coupled plasma (ICP) and, more particularly, to an apparatus for producing silicon nanocrystals, which can minimize plasma diffusion by finely adjusting a plasma region created by an ICP coil.

2. Description of the Related Art

Recently, silicon nanocrystals have been generally used as photoelectric conversion/photo conversion materials such as solar cells or light emitting devices (LEDs). Silicon is an environmentally friendly material, abundant in the Earth's crust and is utilized for various applications in the field of electronic materials. Although silicon exhibits very undesirable optical characteristics in a bulk sate, silicon nanocrystals exhibit highly efficient optical characteristics.

A method of producing silicon nanocrystals can generally be classified into solid state reaction, liquid state reaction, and vapor state reaction.

In the solid state reaction, a thin film of $SiO_2$, $Si_3N_4$, SiC or the like containing an excess of Si is first formed and are then subjected to heat treatment at high temperatures for condensation of silicon to form silicon nanocrystals in a $SiO_2$, $Si_3N_4$ or SiC matrix. As such, the solid state reaction requires the heat treatment at high temperatures to form the silicon nanocrystals and incurs very high manufacturing costs due to expensive deposition equipment.

In the liquid state reaction, silicon nanocrystals are prepared through chemical reaction of silicon compounds, such as a high temperature supercritical method, reduction of silicon halide, and the like. The liquid state reaction has severe difficulty in controlling the particle size of the nanocrystals and incurs low quality in terms of crystallinity and the like.

In the vapor state reaction, silicon nanocrystals are prepared by passing a silane compound gas through a high energy region such as laser or plasma. Since the vapor state reaction allows the silicon nanocrystals to be formed not only in a matrix as in the solid state reaction but also without the matrix, the vapor state reaction produces high purity silicon nanocrystals and permits easier control of the particle size than the other methods.

A high energy source for the vapor state reaction is generally obtained from laser or thermal plasma. With such an energy source, however, the silicon nanocrystals are to aggregated due to high calorific heat, thereby forming secondary particles having a size of several micrometers (μm).

To solve such problems, non-thermal plasma such as inductively coupled plasma (ICP) has recently been used to prevent aggregation of the silicon nanocrystals.

A conventional apparatus for producing silicon nanocrystals based on ICP includes a reactor and an ICP coil wound around the reactor, and is configured to simultaneously supply a primary gas for forming silicon nanocrystals and a secondary gas for surface reaction of the silicon nanocrystals to the reactor.

However, the conventional ICP-based apparatus has a wide plasma reaction area caused by plasma diffusion inside the reactor. As a result, it becomes difficult to control the particle size of the silicon nanocrystals. The plasma diffusion also causes a wide reaction area of the secondary gas and extends reaction time, thereby deteriorating quality of the silicon nanocrystals.

Therefore, there is a need for an apparatus for producing silicon nanocrystals, which can minimize plasma diffusion inside the reactor in production of the silicon nanocrystals using ICP to improve the particle size characteristics and quality of the silicon nanocrystals.

SUMMARY OF THE INVENTION

The present invention is conceived to solve the problems of the related art, and an aspect of the invention is to provide an apparatus for producing silicon nanocrystals, which can minimize plasma diffusion inside a reactor in production of the silicon nanocrystals using inductively coupled high-density plasma by vapor state reaction, thereby improving the particle size characteristics and quality of the silicon nanocrystals.

In accordance with one embodiment of the invention, an apparatus for producing silicon nanocrystals includes a reactor having an ICP coil wound around an outer wall thereof and a tube inserted into the reactor, wherein a primary gas for forming silicon nanocrystals and a secondary gas for surface reaction of the silicon nanocrystals are separately supplied to the reactor through an inner side and an outer side of the tube, respectively.

In accordance with another embodiment of the invention, an apparatus for producing silicon nanocrystals includes: a gas supply part, into which a tube is inserted to allow a primary gas for forming silicon nanocrystals and a secondary gas for surface reaction of the silicon nanocrystals to be separately supplied through an inner side and an outer side of the tube, respectively; a reactor part located below the gas supply part and having an ICP coil wound around an outer wall thereof; a dispersing part located below the reactor part to rapidly cool and disperse the silicon nanocrystals formed in the reactor part; and a collecting part located below the dispersing part to collect the silicon nanocrystals.

The silicon nanocrystals produced by the apparatus according to the embodiments of the invention has a particle size of 1~100 nm.

BRIEF DESCRIPTION OF THE DRAWINGS

The above and other aspects, features and advantages of the invention will become apparent from the following detailed description of embodiments of the invention given in conjunction with the accompanying drawings, in which.

DETAILED DESCRIPTION OF THE EMBODIMENTS

Embodiments of the invention will hereinafter be described in detail with reference to the accompanying drawings.

Figure 1:
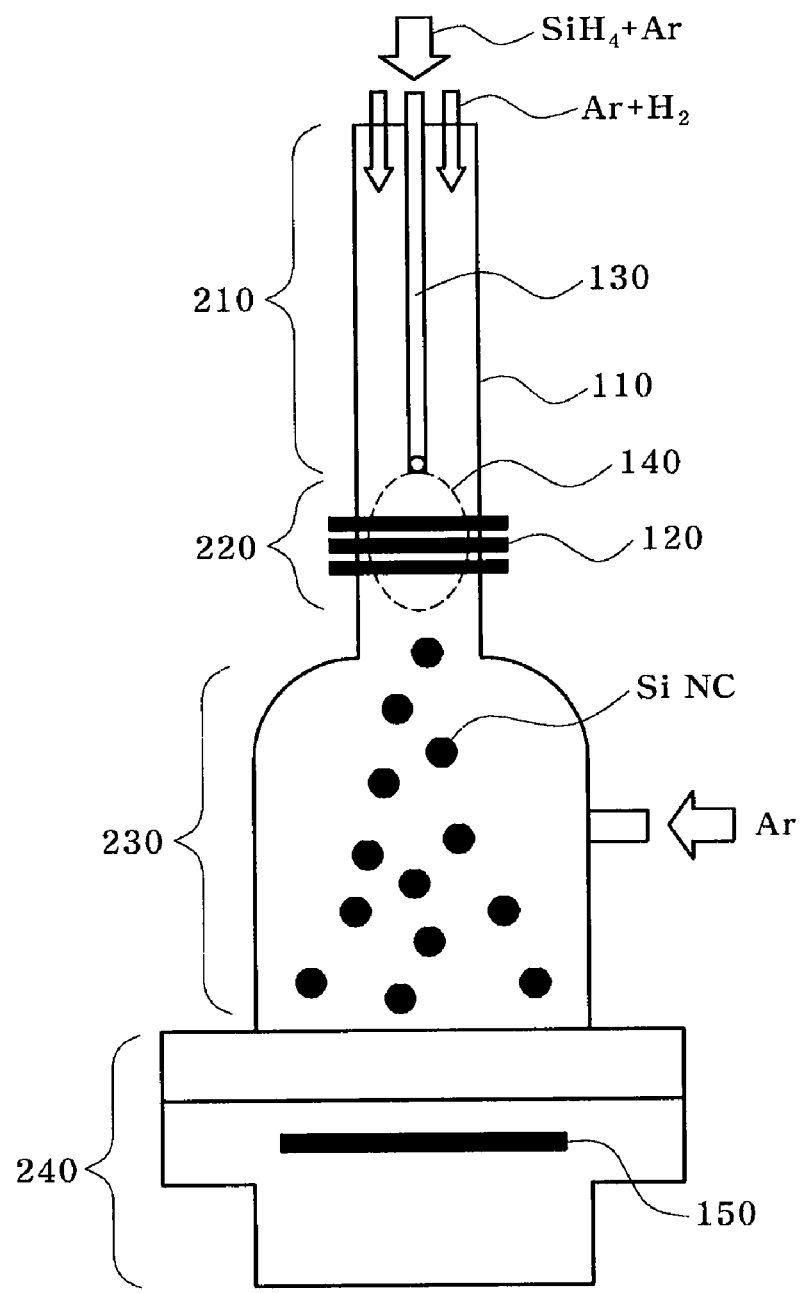
FIG. 1 is a schematic diagram of an apparatus for producing silicon nanocrystals in accordance with one embodiment of the invention.

FIG. 1 schematically illustrates an apparatus for producing silicon nanocrystals in accordance with one embodiment of the invention.

Referring to FIG. 1, the apparatus according to the embodiment includes a reactor 110 in which silicon nanocrystals are produced using ICP.

An ICP coil 120 is wound around an outer wall of the reactor 110 and a tube 130 is inserted into the reactor 110. Here, both the reactor 110 and the tube 130 may be made of quartz that exhibits superior thermal stability.

To produce silicon nanocrystals, gases containing a silicon precursor are supplied into the reactor. In this embodiment, a primary gas containing a precursor such as silane ($SiH_4$) for forming the silicon nanocrystals is supplied to the reactor through an inner side of the tube 130. Further, a secondary gas for surface reaction of the silicon nanocrystals is separately supplied to the reactor along an outer side of the tube 130.

It should be understood that the primary gas can be supplied into the reactor along the outer side of the tube and the secondary gas can be supplied into the reactor through the inner side of the tube. However, it is advantageous to supply the primary gas to the reactor through the inner side of the tube in order to create a narrow plasma reaction region.

The secondary gas may be a gas containing hydrogen ($H_2$) for treating the surface of the silicon nanocrystals or a gas containing a boron (B) or phosphorus (P) compound gas for doping the surface of the silicon nanocrystals. The gases may be supplied alone or in combination with each other.

Each of the primary gas and the secondary gas is supplied together with argon (Ar) gas, which acts as a carrier of silane ($SiH_4$) and the like and as a plasma generating gas. In this case, the primary gas supplied to the reactor through the inner side of the tube 130 may be a mixture of argon (Ar) and silane ($SiH_4$) gases. The secondary gas supplied to the reactor along the outer side of the tube 130 may be a mixture of the argon (Ar) gas and the boron (B) or phosphorus (P) compound gas.

The tube 130 inserted into the reactor 110 has a lower end located above the ICP coil 120 which generates plasma. Here, the height of the lower end of the tube 130 can be adjusted, so that a plasma reaction region 140 can be controlled by adjusting the height of the lower end of the tube 130. Therefore, it is possible to form a narrow plasma reaction region 140, thereby preventing plasma diffusion which causes deterioration in particle size characteristics of the silicon nanocrystals.

The silicon nanocrystals (Si NC) formed in the reactor 110 are dispersed toward a lower space below the reactor 110 and are subjected to rapid cooling by argon gas injected to the lower space. The argon gas supplied into the lower space serves to prevent formation of a secondary particle by rapidly cooling the produced silicon nanocrystals.

The dispersed silicon nanocrystals (Si NC) are collected by a collector. For this purpose, the apparatus may be provided with a mesh filter 150 below the reactor 110.

Referring again to FIG. 1, the apparatus includes a gas supply part 210, a reactor part 220, a dispersing part 230, and a collecting part 240. Here, the gas supply part 210 and the reactor part 220 constitute the reactor 110 as described above.

The tube 130 has a much smaller inner diameter than the gas supply part 210 and is inserted into the gas supply part 210. With this configuration, the primary gas containing a precursor such as silane ($SiH_4$) for forming the silicon nanocrystals and the secondary gas for surface reaction of the silicon nanocrystals, such as surface treatment, surface doping, and the like, are separately supplied through the inner and the outer sides of the tube 130, respectively.

The reactor part 220 is located below the gas supply part 210 and has the ICP coil 120 wound around the outer wall of the reactor part 220 so that the silane compound gas is decomposed to produce the silicon nanocrystals (Si NC) by plasma induced from the ICP coil 120.

The dispersing part 230 is located below the reactor part 220 and rapidly cools and disperses the silicon nanocrystals (Si NC) using the argon gas which is supplied to the lower space below the reactor part 220. The collecting part 240 is located below the dispersing part 230 to collect the silicon nanocrystals.

The gas supply part 210, reactor part 220, and dispersing part 230 may be made of quartz which exhibits superior thermal stability. The gas supply part 210, reactor part 220, and dispersing part 230 may be integrally formed with each other or may be individually formed and then assembled to each other. The tube 130 inserted into the gas supply part 210 may also be formed of quartz.

As shown in FIG. 1, the dispersing part 230 is formed with a separate path through which argon gas is supplied into the dispersing part 230 for flow of the silicon nanocrystals.

The collecting part 240 may be separately formed from the gas supply part 210, the reactor part 220 and the dispersing part 230, and may include the mesh filter 150 to collect the silicon nanocrystals (Si NC).

The lower end of the tube 130 inserted into the gas supply part 210 is located above the ICP coil 120 wound around the outer wall of the reactor part 220. Here, the area of the reactor part 220 is determined depending on the location of the lower end of the tube 130. In other words, the lower end of the tube 130 becomes an upper end of the reactor part 220. When the lower end of the tube 130 is located adjacent to the ICP coil 120, the area of the reactor part 220 is decreased as much as the narrowed separation between the lower end of the tube 130 and the ICP coil 120, thereby producing high-density plasma of a narrow area. Accordingly, plasma diffusion can be suppressed inside the reactor, thereby improving the particle size characteristics of the silicon nanocrystals.

Further, conventionally, the primary and secondary gases are supplied together into the reactor, thereby deteriorating the quality of the silicon nanocrystals. On the contrary, according to the embodiment, the secondary gas is separately supplied into the reactor along the outer side of the tube 130 disposed inside the gas supply part 210, thereby minimizing the reaction time and reaction region between the secondary gas and the silicon nanocrystals.

As described above, the apparatus according to this embodiment is configured to control the plasma generation area, which is a main factor in controlling the particle size of the silicon nanocrystals, thereby minimizing plasma diffusion inside the reactor. Therefore, the silicon nanocrystals may be produced to have a particle size of 1~100 nm by high-density plasma generated in a narrow plasma region. Further, the silicon nanocrystals may be satisfactorily applied to photoelectric conversion/photo conversion materials such as solar cells or light emitting devices (LEDs), which require high optical characteristics.

EXAMPLES

An alternating current of 13.56 MHz was applied with a power of 50-200 W to a coil for producing ICP. With a tube inserted into a reactor, silane and argon gases were supplied as primary gases to the reactor through the interior of the tube while changing a flow ratio of silane and argon in the range of 1:99~10:390. As secondary gases for surface treatment of produced silicon nanocrystals, hydrogen and argon gases were supplied to the reactor along an outer surface of the tube while changing a flow ratio of hydrogen and argon in the range of 1:99~10:90. For cooling a dispersing part, argon was separately supplied at a flow rate of 100 sccm into the reactor. The nanocrystals were produced while changing the total flow rate of the gases in the range of 300500 sccm. At this time, the tube was made of quartz and was spaced 1 cm above the uppermost end of the coil to supply the primary gases.

Table 1 shows particle sizes and crystallinity of silicon nanocrystals produced under different conditions by inventive examples and a comparative example.

TABLE 1

|  | Applied Power (W) | Silane:Ar (sccm) | H:Ar (sccm) | Total flow rate (sccm) | Sojourn time (msec) | Particle size (nm) | Crystallinity |
| --- | --- | --- | --- | --- | --- | --- | --- |
| Example 1 | 50 | 3:197 | 3:97 | 300 | 7.14 | 6~400 | X |
| Example 2 | 80 | 3:197 | 3:97 | 300 | 7.62 | 3~10 | ○ |
| Example 3 | 80 | 5:195 | 3:97 | 300 | 7.62 | 7~13 | ○ |
| Example 4 | 80 | 7:193 | 3:97 | 300 | 7.62 | 5~100 | X |
| Example 5 | 80 | 5:295 | 3:97 | 400 | 6.79 | 15~20 | ○ |
| Example 6 | 80 | 5:395 | 3:97 | 500 | 6.29 | 20~30 | ○ |
| Example 7 | 100 | 3:197 | 3:97 | 300 | 7.38 | 10~20 | ○ |
| Comparative Example | 80 | 3:197 | 3:97 | 300 | 38.1 | 5~400 | X |

As can be seen from Table 1, it is desirable to apply a power of 50 W or more and have a silane partial pressure ratio less than 5% to produce silicon nanocrystals of high quality.

A main factor determining the particle size and particle size distribution of the silicon nanocrystals is a sojourn time of the silane gas in plasma. As the sojourn time decreases, the particle size is decreased and the particle size distribution becomes uniform. Since the sojourn time is decreased in proportion to the decrease in length of the plasma region, the tube used in this apparatus serves to increase the plasma density while reducing the sojourn time through minimization of the plasma region.

Referring to Table 1, in Comparative Example where the tube was not inserted into the reactor, the sojourn time increased to 5 times that of the inventive examples where the tube was inserted into the reactor.

When the sojourn time in plasma increases, the plasma density is lowered and the plasma distribution becomes non-uniform in proportion to the increase in sojourn time, as described above, so that the produced the silicon nanocrystals have low crystallinity and non-uniform particle size distribution. On the other hand, according to the embodiment, the tube is inserted into the reactor to minimize the sojourn time in plasma, thereby solving the problems as described above.

FIGS. 2 to 5 show characteristics of silicon nanocrystals of Example 3.

Figure 2:
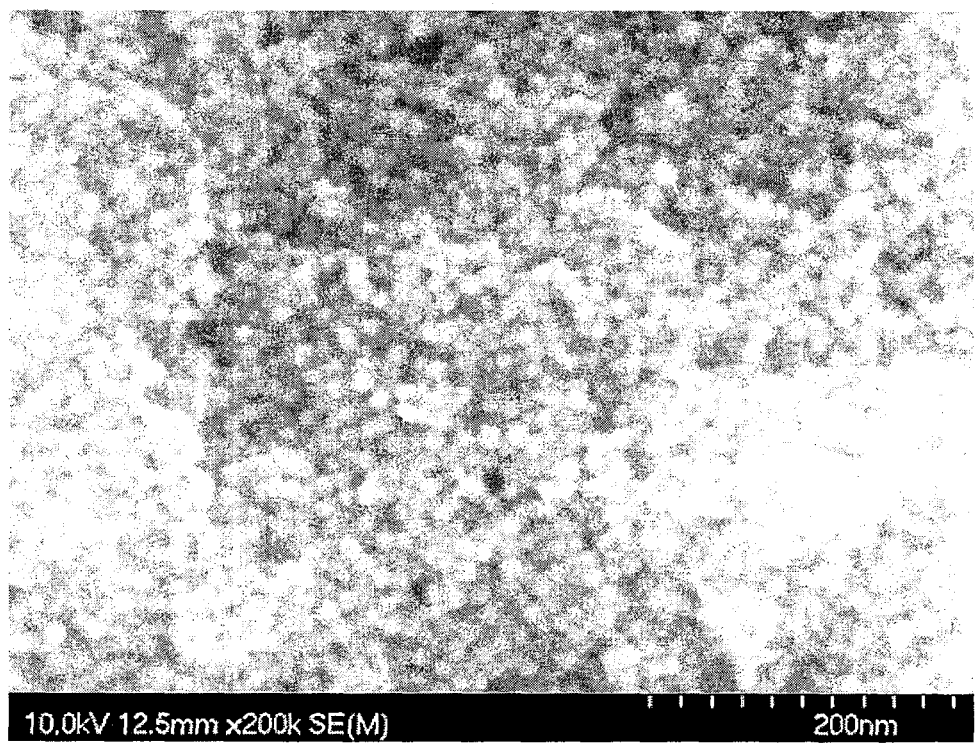
FIG. 2 is a scanning electron microscope (SEM) image of silicon nanocrystals of Example 3.

FIG. 2 is a SEM image of silicon nanocrystals of Example 3. It can be seen from FIG. 2 that nanocrystals of about 10 nm are uniformly distributed.

Figure 3:
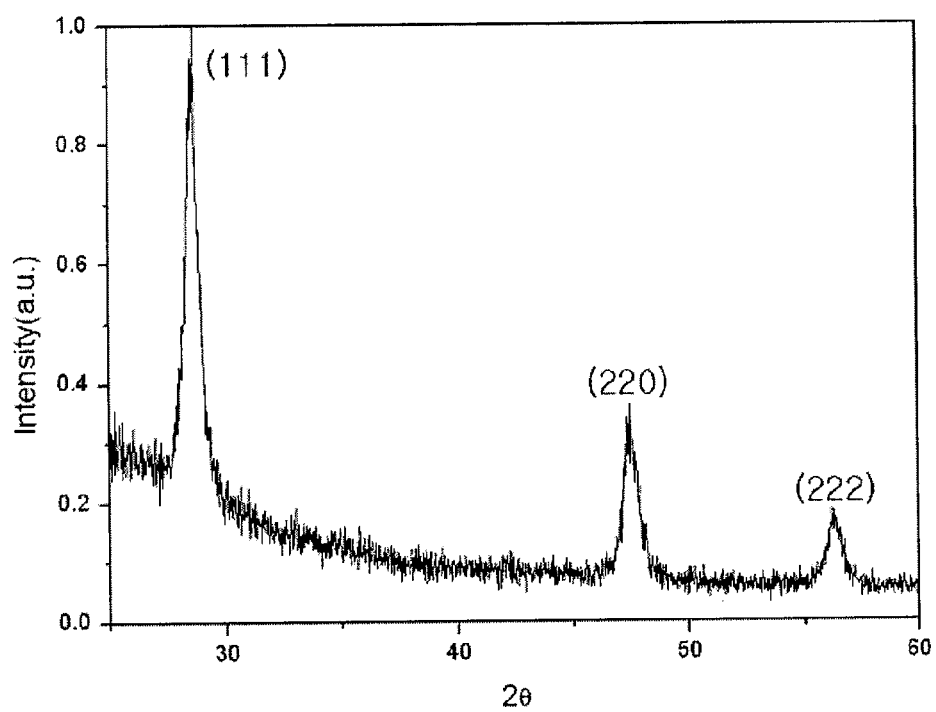
FIG. 3 is an XRD pattern of the silicon nanocrystals of Example 3.

FIG. 3 is an XRD pattern of the silicon nanocrystals of Example 3, showing that the silicon nanocrystals have a (111) plane at a main peak.

Figure 4:
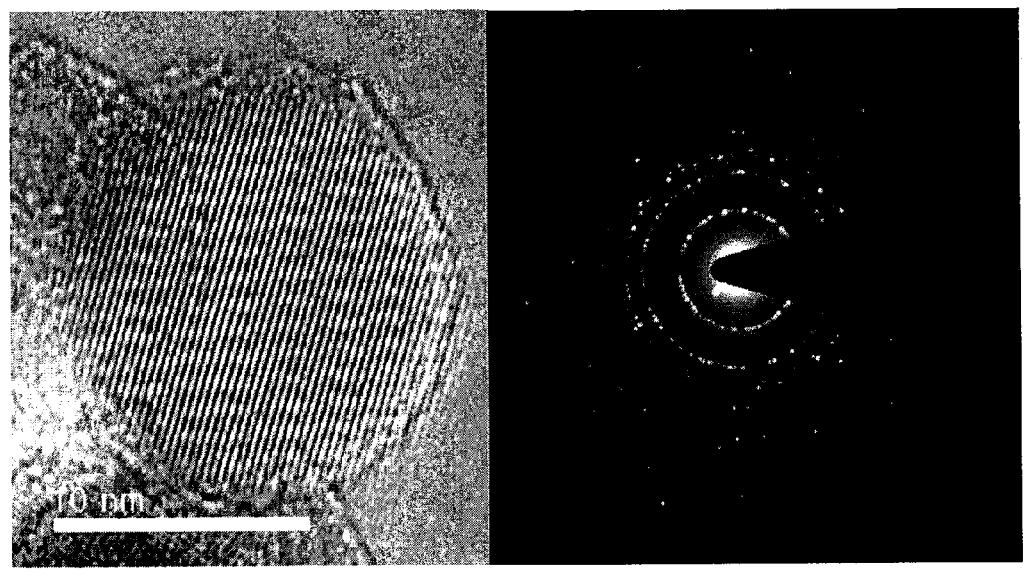
FIG. 4 is a High-Resolution Transmission Electron Microscopy (HRTEM) image and a diffraction pattern of the silicon nanocrystals of Example 3.

FIG. 4 is an HRTEM image and a diffraction pattern of the silicon nanocrystals of Example 3. It can be seen from FIG. 4 that the produced silicon nanocrystals have a substantially spherical shape and are obtained by single-crystal growth in a (111) direction. It is considered that such single-crystal growth can be obtained by ensuring uniform crystal growth through separate supply of primary and secondary gases. Such crystallinity is also shown in the diffraction pattern.

Figure 5:
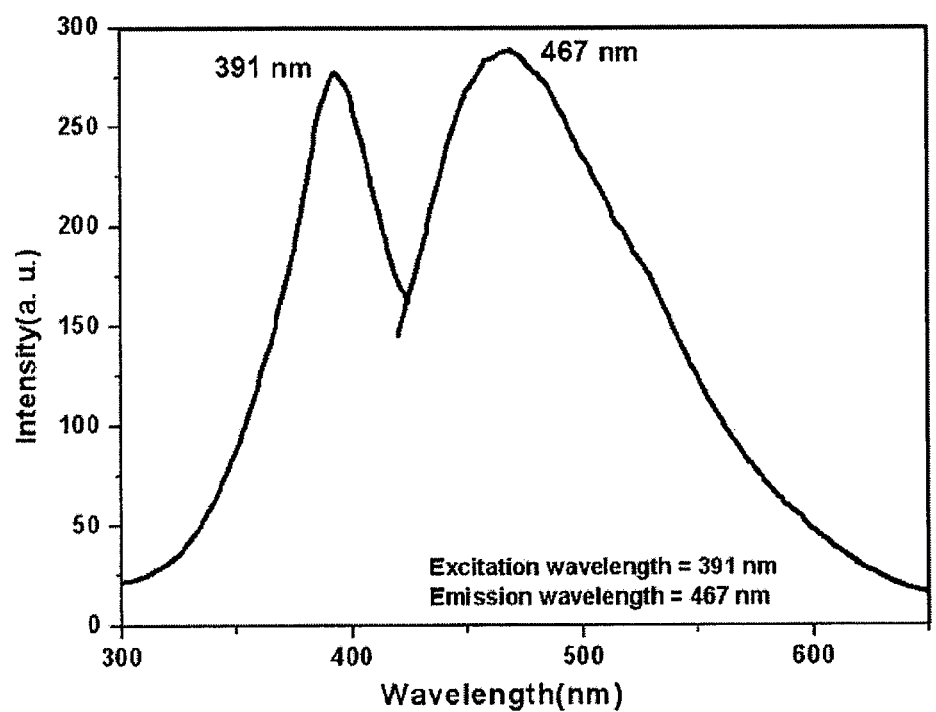
FIG. 5 shows PL (Photoluminescence) spectrum of the silicon nanocrystals of Example 3.

FIG. 5 shows PL (Photoluminescence) spectrum of the silicon nanocrystals of Example 3. It can be seen from FIG. 5 that the silicon nanocrystals of Example 3 emit blue light at a main wavelength of 460 nm.

As such, silicon single nanocrystals of high quality could be produced in a spherical shape to have a particle size of 10 nm or less by the apparatus according to the embodiment of the invention.

Comparative Example

Silicon nanoparticles were obtained by simultaneously supplying primary and secondary gases to the apparatus, which was also used to produce the silicon nanocrystals of the inventive examples but was not provided with the tube therein. For proper comparison, the silicon nanoparticles of Comparative Example were produced under the same conditions as Example 3 except for the use of the tube in the apparatus.

Figure 6:
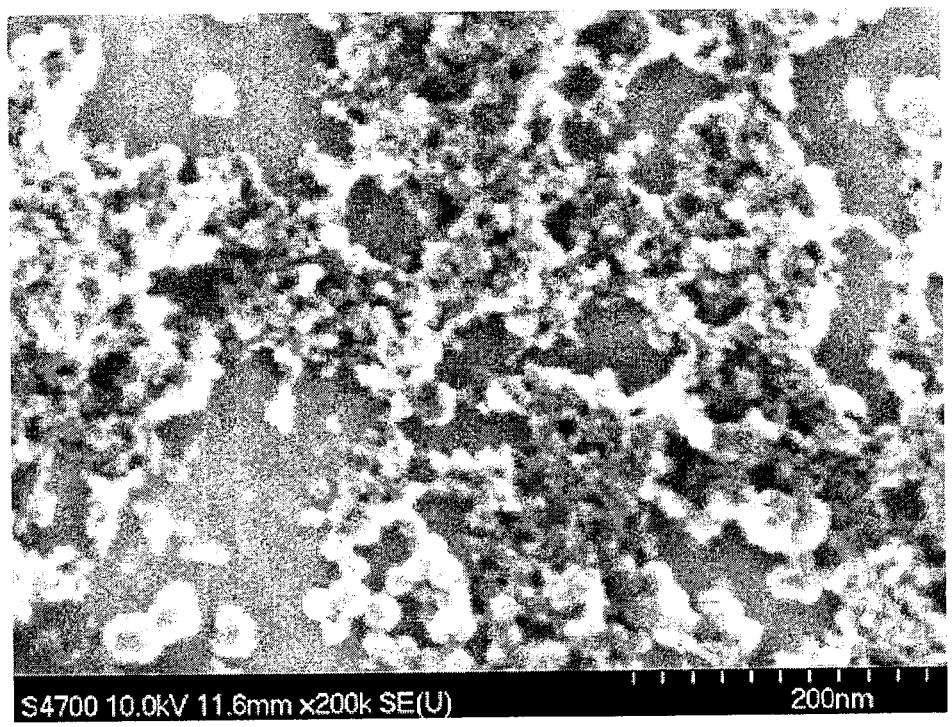
FIG. 6 is an SEM image of silicon nanocrystals of Comparative Example.

FIG. 6 is an SEM image of silicon nanoparticles of Comparative Example, which were produced under the same conditions as Example 3 by simultaneously supplying primary and secondary gases to the apparatus, from which the tube was removed. As shown in FIG. 6, the silicon nanoparticles of Comparative Example were not uniform and had various particle sizes.

Figure 7:
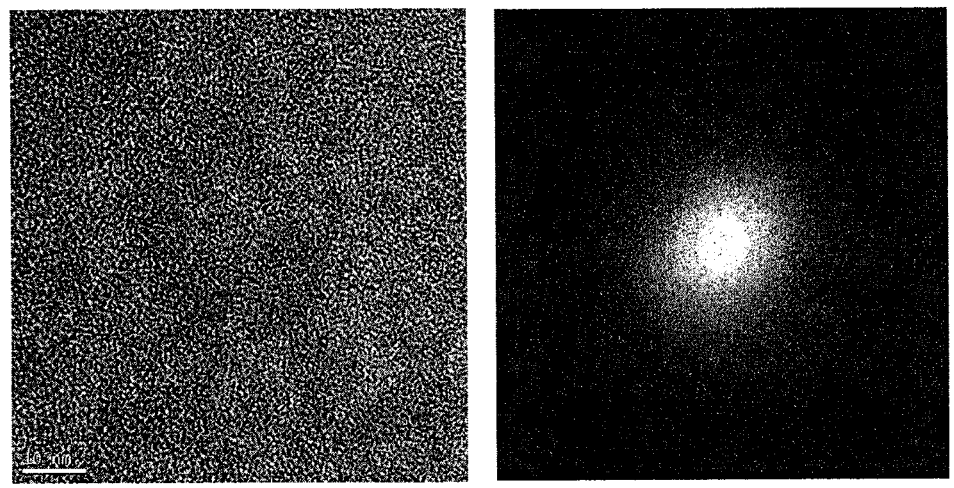
FIG. 7 is an HRTEM image and a diffraction pattern of the silicon nanocrystals of Comparative Example.

An HR-TEM was used for more precise analysis of the silicon nanoparticles obtained by Comparative Example and the result of analysis is shown in FIG. 7. It can be seen from an HR-TEM image and a diffractive pattern of FIG. 7 that the silicon nanoparticles of Comparative Example have non-uniform shapes and are composed of purely amorphous particles.

As described above, the apparatus for producing silicon nanocrystals according to the embodiment of the invention enables a primary gas for forming silicon nanocrystals and a secondary gas for surface reaction of the silicon nanocrystals to be separately supplied to a reactor through a tube inserted into the reactor and can minimize a sojourn time of the silane gas in plasma.

Accordingly, the apparatus according to the embodiment of the invention permits fine adjustment of plasma for producing silicon nanocrystals so as to finely control the particle size and crystallinity of the produced silicon nanocrystals.

As such, in the apparatus supplies according to the embodiments, the primary gas for forming silicon nanocrystals and the secondary gas for surface reaction of the silicon nanocrystals are separately supplied to the inner and outer sides of the tube, thereby enabling fine control of a plasma region created by an ICP coil. As a result, the apparatus can minimize plasma diffusion during production of the silicon nanocrystals, thereby improving the particle size characteristics and quality of the silicon nanocrystals.

Although some embodiments have been provided to illustrate the invention in conjunction with the drawings, it will be apparent to those skilled in the art that the embodiments are given by way of illustration only, and that various modifications, changes, and substitutions can be made without departing from the spirit and scope of the invention, as defined only by the accompanying claims and equivalents thereof.

What is claimed is:

1. An apparatus for producing silicon nanocrystals comprising:
 a gas supply part, into which a tube is inserted to allow a primary gas for forming silicon nanocrystals and a secondary gas for surface reaction of the silicon nanocrystals to be separately supplied through an inner side and an outer side of the tube, respectively;
 a reactor located below the gas supply part and having an ICP coil wound around an outer wall thereof, wherein the primary gas for forming silicon nanocrystals is supplied directly to the reactor through the inner side of the tube in order to create a narrow plasma reacting region and the secondary gas for surface reaction of the silicon nanocrystals is separately supplied to the reactor through the outer side of the tube;
 a dispersing part located below the reactor to rapidly cool and disperse the silicon nanocrystals formed in the reactor; and
 a collecting part located below the dispersing part to collect the silicon nanocrystals.

2. The apparatus according to claim 1, wherein the tube has a lower end located above the ICP coil.

3. The apparatus according to claim 1, wherein the primary gas is a mixture of argon (Ar) and silane ($SiH_4$).

4. The apparatus according to claim 1, wherein the secondary gas contains hydrogen (H2) gas for surface treatment of the silicon nanocrystals.

5. The apparatus according to claim 1, wherein the secondary gas contains a boron (B) or phosphor (P) compound gas for surface doping of the silicon nanocrystals.

6. The apparatus according to claim 1, wherein the tube is made of quartz.

7. The apparatus according to claim 1, wherein the collecting part comprises a mesh filter.

8. The apparatus according to claim 1, wherein argon gas is separately supplied into the dispersing part.

* * * * *